United States Patent [19]

Wang

[11] Patent Number: 5,001,457
[45] Date of Patent: Mar. 19, 1991

[54] ELECTRONIC SIGNAL DEVICE FOR A SET OF PNEUMATIC TIRES

[76] Inventor: Hsug-Fang Wang, No. 129, Tuan-Chu Lane, Tuan-Chu Li, Chiayi City, Taiwan

[21] Appl. No.: 466,592

[22] Filed: Jan. 17, 1990

[51] Int. Cl.$^5$ ............................................. B60C 23/00
[52] U.S. Cl. .................................. 340/447; 340/442; 340/539; 340/445; 340/461; 73/146.4; 73/146.5; 73/146.8; 200/61.22; 116/34 R
[58] Field of Search ............... 340/447, 448, 442, 445, 340/461, 539; 73/146.8, 146.5, 146.4; 200/61.22; 116/34 R, 34 A, 34 B

[56] References Cited

U.S. PATENT DOCUMENTS

| | | | |
|---|---|---|---|
| 4,319,220 | 3/1982 | Pappas et al. | 340/447 |
| 4,334,215 | 6/1982 | Frazier et al. | 340/447 |
| 4,734,674 | 3/1988 | Thomas et al. | 340/447 |
| 4,737,760 | 4/1988 | Huang et al. | 73/146.8 |

*Primary Examiner*—Donnie L. Crosland
*Attorney, Agent, or Firm*—Finnegan, Henderson, Farabow, Garrett & Dunner

[57] ABSTRACT

An electronic signal device for a set of pneumatic tires of a vehicle includes a plurality of pressure gauges, each respectively attached to the pneumatic tires, each pressure gauge having a cap unit which houses a switching unit responsive to the pressure in the respective tire and a signal transmitting unit electrically connected to the switching unit and activated when pressure in the tire is deficient. Each tire is represented by a binary code which is transmitted to a receiver circuit when said tire is deflated below a predetermined proper pressure. The receiver circuit is found inside the driver room of the vehicle and is electrically connected to a display means. The display means has a display plate with a figure of the vehicle on said display plate, and a plurality of light emitting diodes electrically connected to the receiver circuit, arranged on the figure in such a manner that each light emitting diode corresponds to a specific tire and the relative position of the tire with respect to the vehicle body. The display means further includes an elongated casing which houses the display plate and is rotatably mounted to a support member. A sound alarm unit, similarly connected to the receiving circuit, sounds whenever the tire is deflated below a predetermined proper pressure.

12 Claims, 6 Drawing Sheets

| TIRE | 1 | 2 | 3 | 4 | 5 | 6 | 7 | 8 | 9 | 10 | 11 | 12 |
|---|---|---|---|---|---|---|---|---|---|---|---|---|
| D | 0 | 0 | 0 | 0 | 0 | 0 | 0 | 1 | 1 | 1 | 1 | 1 |
| C | 0 | 0 | 0 | 1 | 1 | 1 | 1 | 0 | 0 | 0 | 0 | 1 |
| B | 0 | 1 | 1 | 0 | 0 | 1 | 1 | 0 | 0 | 1 | 1 | 0 |
| A | 1 | 0 | 1 | 0 | 1 | 0 | 1 | 0 | 1 | 0 | 1 | 0 |

ELECTRONIC SIGNAL DEVICE FOR A SET OF PNEUMATIC TIRES

BACKGROUND OF THE INVENTION

This invention relates to an electronic signal device for a set of pneumatic tires, more particularly to an electronic signal device which has an electrical sound producing unit for the purpose of alarming when one of the tires is deflated to a pressure below a predetermined proper pressure and a display means to indicate which of the tires is seriously deflated.

Signal devices for pneumatic tires are known in the art U.S. Pat. No. 4,814,745, owned by the applicant of this invention, discloses a pressure gauge to be attached to a tire after the tire is inflated. The device includes an electric alarming unit mounted in a cap-like casing, which makes a sound whenever the tire is deflated to a pressure below a predetermined proper pressure. In an ordinary car employing this invention, one would have to listen carefully as to where the sound is coming from to determine which of the tires is seriously deflated. However, if the vehicle in question is a 12-wheeler truck, this device is not practical, since the sound generated by the device may not be audible to the driver due to the fact that the tires may be too far away.

SUMMARY OF THE INVENTION

Therefore, the object of this invention is to provide a signal device including an electric alarm producing unit that will sound when the tire to which the device is attached is seriously deflated and a display means for indicating which of the tires is seriously deflated.

This invention provides a pressure gauge with a combined cap unit and signal transmitting unit for each of the tires of a vehicle. The pressure gauge comprises a cap-like casing and a hollow adaptor threadedly coupled together. The hollow adaptor has a stepped portion defining an annular shoulder and an internal thread formation adjacent to the annular shoulder. A transverse partition member is formed in the adaptor and has a central finger piece axially projecting therefrom to open the inflating valve of the tire and the air inlet openings.

A disc member, which is made of a resilient material, is secured to the annular shoulder by its annular flange. The disc member cooperates with the partition member to confine an air chamber which is communicated with the air inlet openings of the partition member. The disc member has a projection axially extending in a direction opposite the finger piece. A conductive hollow screw member is inserted in the adaptor to clamp the peripheral flange of the disc member against the annular shoulder. The screw member has an external thread engaged with the internal thread of the adaptor.

A signal transmitting unit is mounted in the cap-like casing and has a cell means in contact with a coil spring, which in turn is connected to a conductive plate to urge the conductive plate to contact with the conductive hollow screw. The projection of the disc member pushes the conductive plate away from the hollow screw member when the tire is not deflated. The spring urges the conductive plate in contact with the hollow screw member when the tire is deflated to a predetermined reduced pressure.

Each of the tires of the vehicle is represented by a binary code. Each bit of the binary code may have a value of "1", which means that it is to be connected to the most positive terminal of the cell means, or "0", which means that it is to be connected to the most negative terminal of the cell means. The binary code serves as input to the signal transmitting unit, which is activated when the conductive plate is in contact with the hollow screw member. The binary code is transmitted wirelessly by the signal transmitting unit to a receiving means. The receiving means amplifies the received signal and is electrically coupled to a display means installed near the vehicle's driver. The display means comprises a plurality of light emitting diodes (LEDs), which are arranged in such a manner that each LED corresponds to a specific tire and its relative position with respect to the vehicle body. A sound alarming unit is also electrically coupled to the receiving means and sounds whenever one of the tires is deflated below a predetermined proper pressure level.

BRIEF DESCRIPTION OF THE DRAWINGS

Other features and advantages of this invention will become apparent in the following detailed description of the preferred embodiment of this invention, with reference to the accompanying drawings, in which.

DETAILED DESCRIPTION OF THE PREFERRED EMBODIMENT

Figure 1:
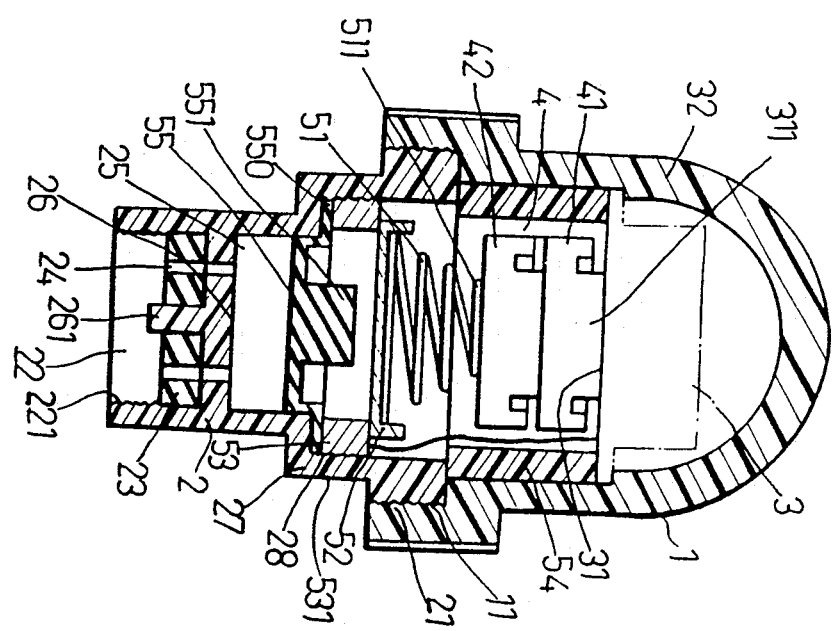
FIGS. 1, 2 are sectional views of a pressure gauge disclosed in U.S. Pat. No. 4,814,745.

Referring to FIG. 1, a pressure gauge disclosed in U.S. Pat. No. 4,814,745 by the inventor of this application includes a cap unit comprising a cap-like casing 1 and a hollow adaptor 2, which are made of an electric insulating material and threadedly coupled together. The cap-like casing 1 has a round closed end and an open end with an internal thread 11. The hollow adaptor 2 has an open end 22 which has an internal thread 221 to connect threadedly to an inflating valve of a tire. Another open end of the hollow adaptor 2 has an external thread 21 which engages the thread 11 of the cap-like casing 1. Adjacent to the open end 22 of the hollow adaptor 2 is a transverse partition plate 26, which has a central axially extending finger piece 261 to push the inflating valve of a tire to an open position when the adaptor 2 is mounted on the inflating valve. The partition plate 26 is further provided with air inlet openings 24. A gasket 23 is press fitted in the adaptor member and abuts with the partition plate 26. The wall of the hollow adaptor member 2 is stepped to form an annular shoulder 27 and has an internal thread 28.

In the hollow adaptor 2 is a disc member 55, which is made of a rubber material and has a peripheral flange 550 clamped by a hollow screw member 53 against the annular shoulder 27. The hollow screw member 53 is made of a conductive metal and engages with the internal thread 28 of the adaptor 2, thereby firmly holding the disc member 55 in the adaptor 2. The disc member 55 further has a projection 551 extending axially therefrom in a direction opposite the finger piece 261 of the partition member 26. The disc member 55 and the partition member 26 cooperate to confine an air chamber 25, which is communicated with the interior of the tire through the inflating valve of the tire and air inlet openings 24.

A signal transmitting unit 3, which will be discussed later in greater detail, is disposed adjacent to the closed end of the cap-like casing 1. It includes a substantially circular printed circuit board 31 containing a signal transmitting circuitry. The circuit board 31 is seated on an annular shoulder 32 and clamped thereat by a sleeve 54, which is made of an insulating material and inserted into the casing 1. The sleeve 54 and the circuit board 31 confine a chamber 4 to accommodate batteries 41, 42.

The pressure gauge has a pressure responsive switching means in connection with the signal transmitting unit 3. The printed circuit board 31 has a terminal 311 in contact with a positively charged terminal of the battery. A conductive coil spring 51 has one end 511 in contact with a negatively charged terminal of the battery. The coil spring 51 is connected to a conductive plate 52 to urge the plate 52 to contact the end of the hollow screw member 53. The hollow screw member 53 is in turn connected to another terminal of the printed circuit board 31.

Figure 2:
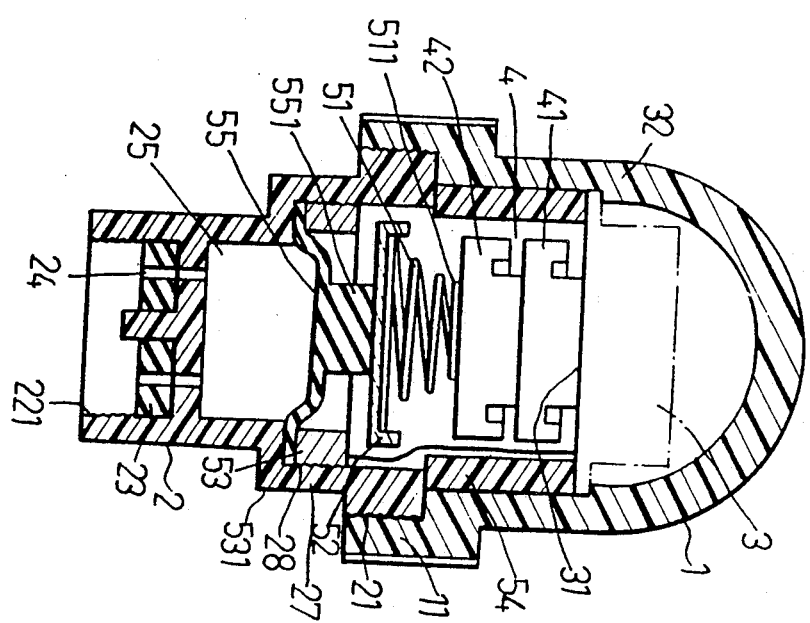

When the pressure gauge is attached to the inflating valve of an inflated tire, the valve of the tire is opened by the finger piece 261 and the disc member 55 is pushed upward as shown in FIG. 2. The projection 551 of the disc member 55 pushes the conductive plate 52 against the force of the spring 51 and thereby separates the conductive plate and the hollow screw member 53, placing the signal transmitting unit in an OFF position. When the tire is deflated below a predetermined proper pressure, the conductive plate 52 is pushed by the spring 51 to be in contact with the hollow screw member 53.

Figures 3, 4:
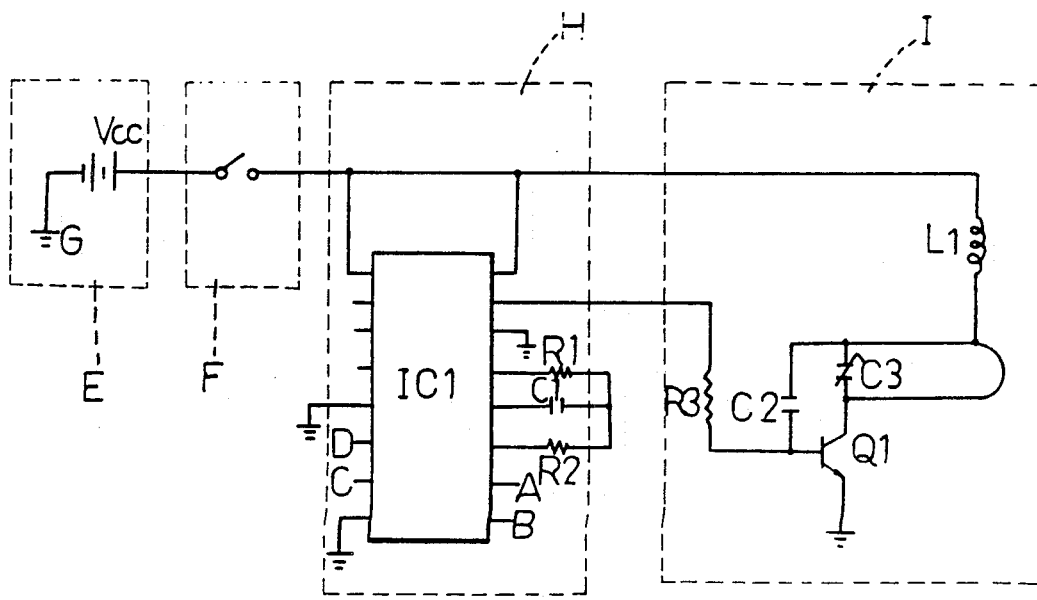
FIG. 3 is a circuit diagram of a signal transmitting unit of the present invention contained by the pressure gauge of FIGS. 1, 2.
FIG. 4 shows a table of a binary code representation of the tires of a vehicle according to the present invention.

According to this embodiment, the above mentioned pressure gauge is attached to each tire of a vehicle. The signal transmitting unit 3 of each pressure gauge transmits a signal in response to the deficient pressure condition in the respective tire. Referring to FIG. 3, a circuit diagram of the signal transmitting unit 3 is shown. Blocks E and F represent the pressure switching system of one of the pressure gauges. When the pressure responsive switch F is closed, the cell means 41, 42 (hereinafter designated as Vcc) supplies power to IC1, which is an encoder having bits A, B, C and D as its input. IC1 serially outputs these bits in a serial bit stream. The circuit of Block I modulates the output of IC1 into a series of AC signals. The modulated output is taken from the nodes of a variable capacitor C3 in Block I and is wirelessly transmitted, later received by a receiving means near the driver's seat of the vehicle. This transmission of signal is possible since the cap-like casing 1 is made of plastic. Some materials, such as metals, will not allow radio waves to penetrate.

The bits A, B, C and D represent the tires of the vehicle in use. For example, the left front wheel of the vehicle may be represented with the 4-bit binary word 0000, the right front wheel with the 4-bit binary word 1000, and so on. No two tires can be represented by exactly the same binary word. A "1" means that the bit is to be connected to the most positive terminal of Vcc and a "0" means that the bit is to be connected to the most negative or ground terminal of Vcc. The input bits A, B, C and D of each signal transmitting unit 3 should be preset according to this configuration before the signal device can be used. FIG. 4 shows an example of a typical representation of the tires of a 12-wheel vehicle. The tires all have different binary words representing them.

Figure 5:
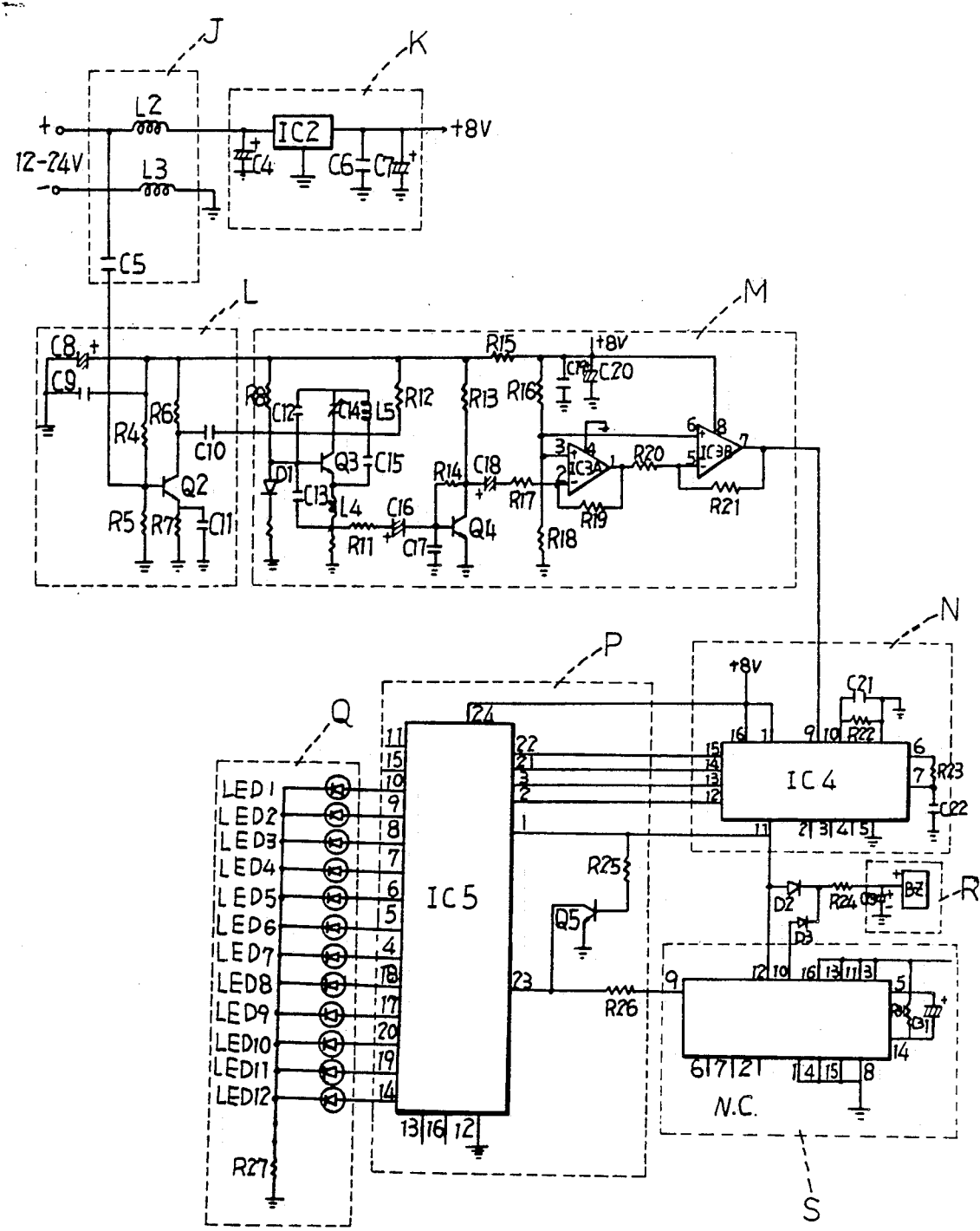
FIG. 5 is a circuit diagram of a receiving means according to the present invention.
Figures 1, 5:
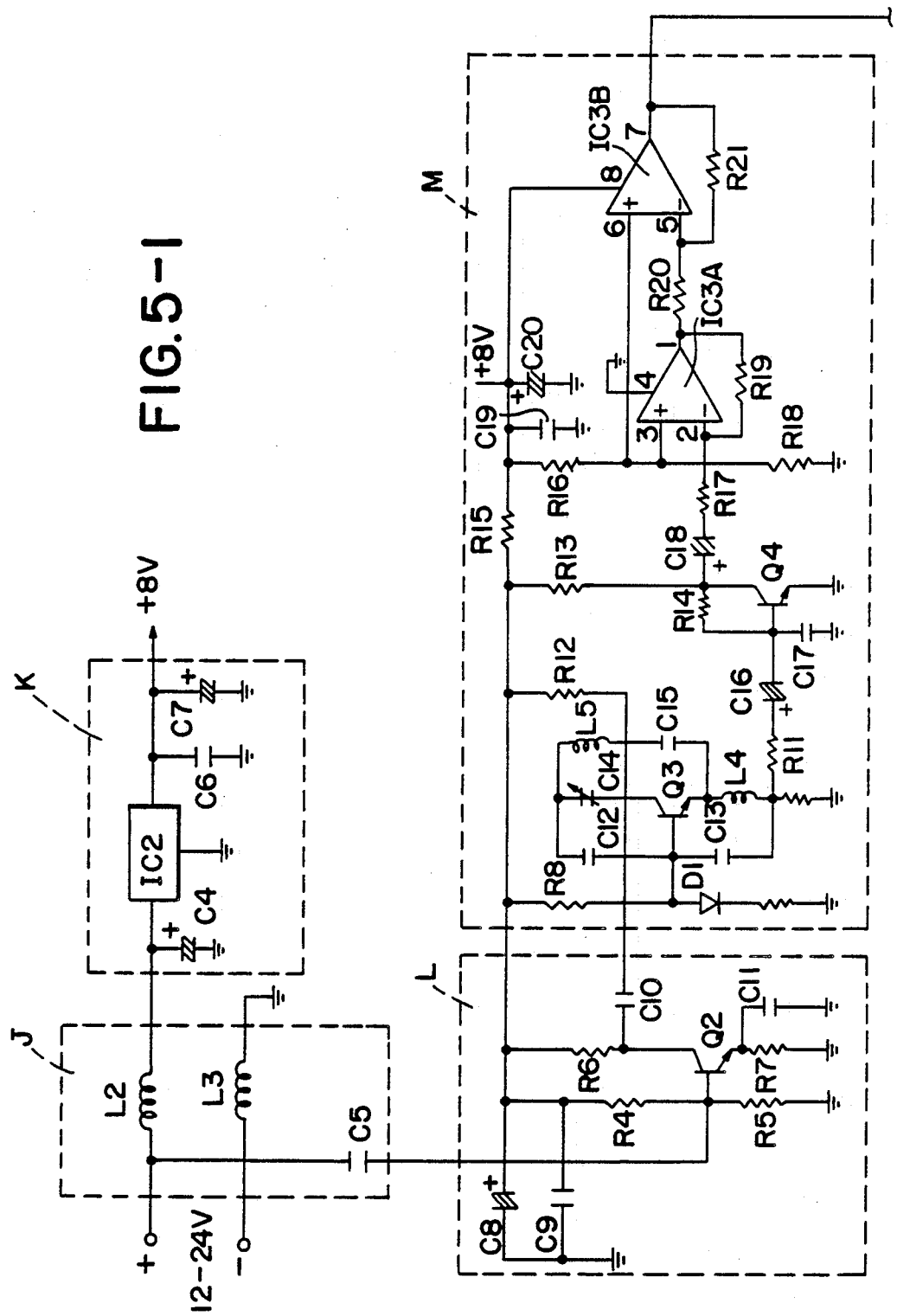
Figures 2, 5:
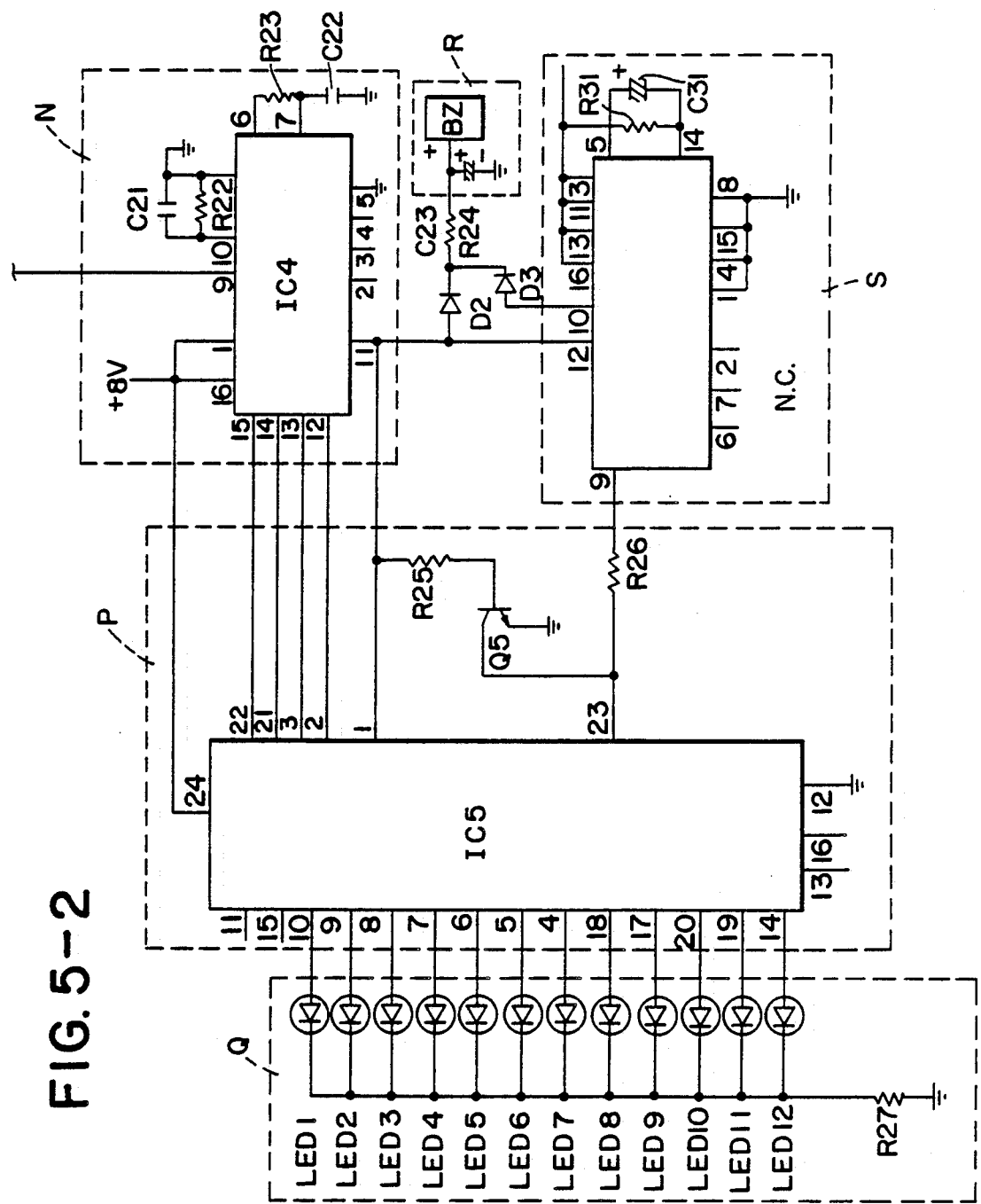

The receiving means found inside the vehicle is illustrated in FIG. 5. The input terminals of a coupling circuit J is connected to a car battery having a voltage range of 12-24 volts. All DC inputs to the coupling circuit J are directed by the inductor L2 to be regulated by the regulator circuit K, the output of which is an 8 volt DC voltage to be used as a power supply for the plurality of circuits found in the receiving means.

The transmitted signal coming from Block I is picked up and serves as another input to the coupling circuit J. The transmitted signal, which is an AC signal, is directed by the coupling capacitor C5 to the transistor amplifier circuit L. The amplified signal is then demodulated at IC3A back into the serial bit output of IC1 and any accompanying noise signal is filtered out at IC3B by the circuit of Block M. The output of the circuit of Block M serves as an input to a serial-to-parallel converter of Block N. Block N comprises a decoder IC4 having four output pins that go high or low depending on the state of the four bit binary word. The four output pins of the decoder IC4 serve as input to a 4-to-16 line decoder IC5 whose output pins are in turn connected to LEDs found on a display means Q. The decoder IC4 is also electrically coupled to a sound alarming circuit R having a buzzer therein. Whenever a valid transmission occurs between the decoder IC4 and the decoder IC5, the buzzer will sound and the display means Q will light up an LED to indicate which of the tires is deflated. IC6 is a resettable multivibrator whose time constant is set by a resistor R31 and a capacitor C31 to a period such as 5 seconds. Should any error cause the decoder IC4 to accidentally give an output to the decoder IC5, the multivibrator IC6 will send out a pulse and reset both the buzzer of the alarming unit R and the decoder IC5.

Figure 6:
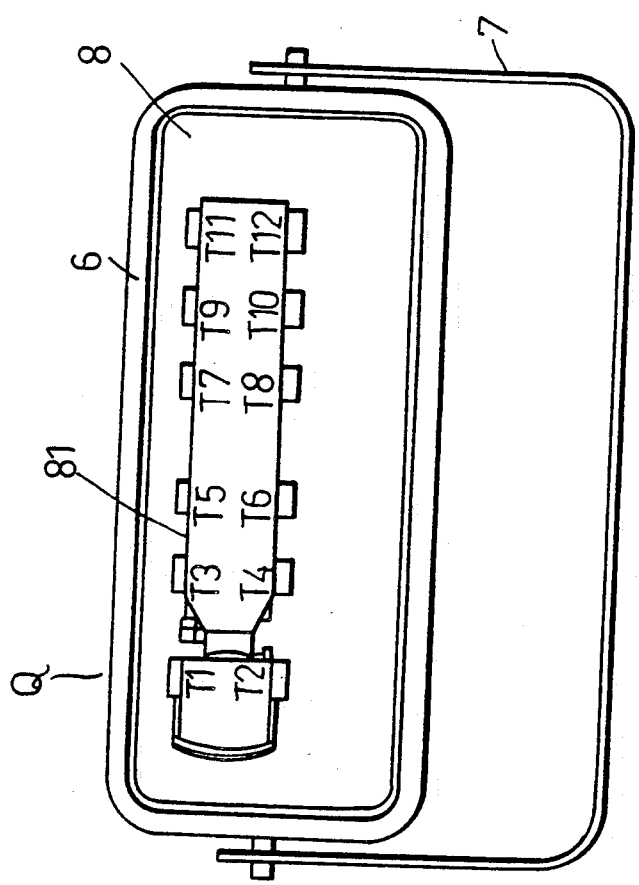
FIG. 6 is a front view of a display means according to this invention.

Referring to FIG. 6, the display means Q comprises an elongated casing 6 rotatably mounted to a U-shaped support 7. The elongated casing 6 houses a display plate 8 which has the LEDs arranged on a figure showing the top view of the vehicle 81 in such a manner that each LED corresponds to a specific tire and its relative position with respect to the vehicle body. A main advantage of this invention is that both the display means and the sound alarming unit can be found inside the driver room of the vehicle, ensuring that the sound generated by the sound alarming unit is audible. The addition of the display means makes it easier for the driver to see which of the tires is deflated.

Although this embodiment employs the pressure gauge as described, this invention should not be limited thereto. Any pressure gauge which has a pressure responsive electric switching system can be incorporated with the signal transmitting unit according to the present invention and used in the signal device of the present invention.

While the present invention has been described in connection with what is considered the most practical and preferred embodiment, it is understood that the invention is not limited to the disclosed embodiments, but is intended to cover various arrangements included within the spirit and scope of the broadest interpretation so as to encompass all such modifications and equivalent arrangements.

I claim:

1. An electronic signal device for a set of pneumatic tires of a vehicle, comprising:

a plurality of pressure gauges respectively attached to the pneumatic tires, each said pressure gauge including a cap-like casing; a hollow adaptor threaded to the cap-like casing and having a central finger piece for opening the inflating valve of the tire; a disc member secured inside the hollow adaptor and having a projection extending in a direction opposite the finger piece; a hollow screw member for securing the disc member to the hollow adaptor and having an annular end serving as an electrical contact surface; a signal transmitting unit electrically connected to the electrical contact surface of the hollow screw member and mounted inside the cap-like casing; a cell means electrically connected to the signal transmitting unit; and means for electrically connecting the cell means to the electrical contract surface of the hollow screw member, which includes a conductive plate member to contact the electrical contact surface and a coil spring having one end connected to the conductive plate and the other end electrically connected to the cell means; said signal transmitting unit transmitting through the air a binary code signal unique to that gauge when said tire to which the gauge is attached is deflated below a predetermined proper pressure;

a remote receiver circuit for receiving the binary code signal transmitted by said signal transmitting unit of said pressure gauges; and display means located adjacent the driver of the vehicle having a display plate with a figure depicting a top view of the vehicle on said display plate, and a plurality of light emitting diodes electrically connected to said receiving circuit and arranged on said figure in such a manner that each said light emitting diode corresponds to a specific tire of the vehicle and its relative position with respect to the vehicle body whereby when a binary code signal is received from a pressure gauge by the receiver circuit it lights up the diode on the figure of that tire to which that gauge is attached, said display means including a sound alarm unit having a buzzer therein electrically coupled to said receiver circuit and activated whenever a light emitting diode is activated.

2. The electronic signal device of claim 1, wherein said display means is mounted in an elongated casing that is rotatably mounted in a support member.

3. The electronic signal device of claim 1, wherein each said binary code signal is a four bit binary word.

4. The electronic signal device of claim 3, wherein said signal transmitting means includes an encoder having said four bit binary word as its input and which outputs said four bit binary word in a serial bit stream.

5. The electronic signal device of claim 4, wherein said signal transmitting unit includes a battery for operating said unit and wherein each bit of said four bit binary word that has a value of "1" is adapted to connect to the positive terminal of the battery and each bit of said four bit binary word that has a value of "0" is adapted to connect to the negative terminal of the battery.

6. The electronic signal device of claim 5, wherein each said signal transmitting unit further includes a modulator to modulate said serial bit stream into a series of AC signals prior to transmission.

7. The electronic signal device of claim 6, wherein said receiver circuit comprises a coupling circuitry for picking up said transmitted signals;

a demodulating circuit electrically coupled to said coupling circuitry, said demodulating circuit having said serial bit stream as its output:

a filter circuit electrically coupled to the output of said demodulating circuit for filtering out noise; and a serial-to-parallel converter electrically connected to the output of said filter circuit and having an output equivalent to said four bit binary word.

8. The electronic signal device of claim 7, wherein said receiver circuit further includes an amplifier circuit electrically coupled to said coupling circuit, serving an input to said demodulating circuit, whereby the output of said coupling circuit is amplified prior to demodulation.

9. The electronic signal device of claim 8, wherein said receiver circuit further includes a 4-to-16 line decoder having four input pins and 16 output pins; said four input pins being electrically connected to the output of said serial-to-parallel converter.

10. The electronic signal device of claim 9, wherein each of said light emitting diodes is connected to one of said output pins of said 4-to-16 line decoder.

11. The electronic signal device of claim 9, wherein said receiver circuit further comprises a resettable multivibrator electrically connected to said 4-to-16 line decoder and said sound alarm unit; said resettable multivibrator resets said 4-to-16 line decoder and said sound alarm unit whenever any error occurs which might accidentally cause said serial-to-parallel converter to give an output to said 4-to-16 line decoder and said sound alarm unit.

12. The electronic signal device of claim 11, wherein said receiver circuit further comprises a regulator circuit having the voltage output of a car battery as its input and a constant 8 volts as its output, said output of said regulator circuit serving as a power supply for said receiver circuit.

* * * * *